(12) United States Patent
Tsai et al.

(10) Patent No.: US 9,411,035 B2
(45) Date of Patent: Aug. 9, 2016

(54) METHOD AND ELECTRONIC APPARATUS FOR ANGLE ESTIMATION VERIFICATION

(71) Applicant: National Chiao Tung University, Hsinchu (TW)

(72) Inventors: Tsung-Yu Tsai, Hsinchu (TW); Chung-Jung Huang, Hsinchu (TW); Ta-Sung Lee, Hsinchu (TW)

(73) Assignee: National Chiao Tung University, Hsinchu (TW)

( * ) Notice: Subject to any disclaimer, the term of this patent is extended or adjusted under 35 U.S.C. 154(b) by 361 days.

(21) Appl. No.: 14/106,853

(22) Filed: Dec. 16, 2013

(65) Prior Publication Data

US 2015/0097717 A1    Apr. 9, 2015

(30) Foreign Application Priority Data

Oct. 7, 2013    (TW) .............................. 102136235 A

(51) Int. Cl.
*G01S 13/93*    (2006.01)
*G01S 3/74*    (2006.01)
*G01S 7/40*    (2006.01)
*G01S 13/34*    (2006.01)
*G01S 13/42*    (2006.01)

(52) U.S. Cl.
CPC ... *G01S 3/74* (2013.01); *G01S 7/40* (2013.01); *G01S 7/4026* (2013.01); *G01S 13/34* (2013.01); *G01S 13/42* (2013.01); *G01S 13/931* (2013.01)

(58) Field of Classification Search
CPC .... G01S 13/931; G01S 3/74; G01S 2007/403
USPC .................................... 342/70, 107, 133, 195
See application file for complete search history.

(56) References Cited

U.S. PATENT DOCUMENTS 5,731,778 A    3/1998    Nakatani et al.
5,751,240 A    5/1998    Fujita et al.
(Continued)

FOREIGN PATENT DOCUMENTS

CN    1537237    10/2004
CN    101779139    7/2010

OTHER PUBLICATIONS

Choi et al., "High angular resolution estimation methods for vehicle FMCW radar," 2011 IEEE CIE International Conference on Radar (Radar), Oct. 24-27, 2011, pp. 1868-1871.
(Continued)

*Primary Examiner* — John B Sotomayor
*Assistant Examiner* — Marcus Windrich
(74) *Attorney, Agent, or Firm* — Jianq Chyun IP Office

(57) ABSTRACT

A method for angle estimation verification, adapted for verifying an estimated angle calculated by an electronic apparatus having an angle estimator and at least three antennas, is provided. The estimated angle is extracted from the angle estimator. An autocorrelation matrix is generated according to a signal vector formed by a plurality of measurements of a received signal received by each of the antennas so as to obtain a plurality of eigenvalues. Among phase difference data generated by a plurality of antenna groups formed by all different combinations of two of the antennas, a plurality of possible estimated angles corresponding to the phase difference data not caused by a coterminal angle effect are calculated. According to the eigenvalues and the possible estimated angles, whether the received signal corresponds to a single target or multiple targets is determined so as to verify the reliability of the estimated angle.

12 Claims, 2 Drawing Sheets

(56) References Cited

U.S. PATENT DOCUMENTS

| | | | |
|---|---|---|---|
| 6,888,494 | B2 | 5/2005 | Tamatsu et al. |
| 6,930,638 | B2 * | 8/2005 | Lloyd .................. G01S 13/003 342/450 |
| 6,952,460 | B1 * | 10/2005 | Van Wechel ............ G01S 1/024 342/357.59 |
| 7,545,313 | B2 * | 6/2009 | Okamura ............... G01S 7/4026 342/173 |
| 7,567,201 | B2 | 7/2009 | Miyake |
| 7,760,134 | B2 | 7/2010 | Morinaga et al. |
| 7,907,083 | B2 | 3/2011 | Sakamoto et al. |
| 8,928,522 | B2 * | 1/2015 | Kurono .................... G01S 3/74 342/104 |
| 2004/0189523 | A1 * | 9/2004 | Kishigami ........... G06K 9/0057 342/417 |
| 2009/0224978 | A1 * | 9/2009 | Shirakawa ................ G01S 3/74 342/386 |
| 2010/0073216 | A1 * | 3/2010 | Sakamoto ................ G01S 3/74 342/70 |
| 2010/0134344 | A1 * | 6/2010 | Uesato ..................... G01S 3/46 342/156 |
| 2010/0225528 | A1 * | 9/2010 | Shijo .................. G01S 13/4463 342/157 |
| 2011/0273326 | A1 * | 11/2011 | Shirakawa ................ G01S 7/40 342/25 R |
| 2015/0130655 | A1 * | 5/2015 | Aizawa .................... G01S 3/74 342/147 |

OTHER PUBLICATIONS

Fukushima et al., "A Music method for radar that measures the angle of arrival by using a scanning beam radar," Electronics and Communications in Japan (Part I: Communications), Oct. 2006, pp. 24-33, vol. 89, Issue 10.

Morinaga et al., "DOA estimation of coherent waves for 77GHZ automotive radar with three receiving antennas," Proceedings of 6th European Radar Conference, Sep. 30, 2009-Oct. 2, 2009, pp. 145-148.

Hacker and Yang, "Single snapshot DOA estimation," Advances in Radio Science, Sep. 30, 2010, pp. 251-256.

Huang et al., "FMCW MIMO transceiver for middle-range over-the-horizon radar," 2012 IEEE International Conference on Signal Processing, Communication and Computing (ICSPCC), Aug. 12-15, 2012, pp. 20-25.

Rohling et al., "Lateral velocity estimation for automotive radar applications," 2007 IET International Conference on Radar Systems, Oct. 15-18, 2007, pp. 1-4.

Huang et al., "A closed-form phase-comparison ML DOA estimator for automotive radar with one single snapshot," IEICE Electronics Express, Apr. 10, 2013, pp. 1-7, vol. 10, No. 7.

"Office Action of Taiwan Counterpart Application", issued on Sep. 29, 2014, p. 1-p. 3.

* cited by examiner

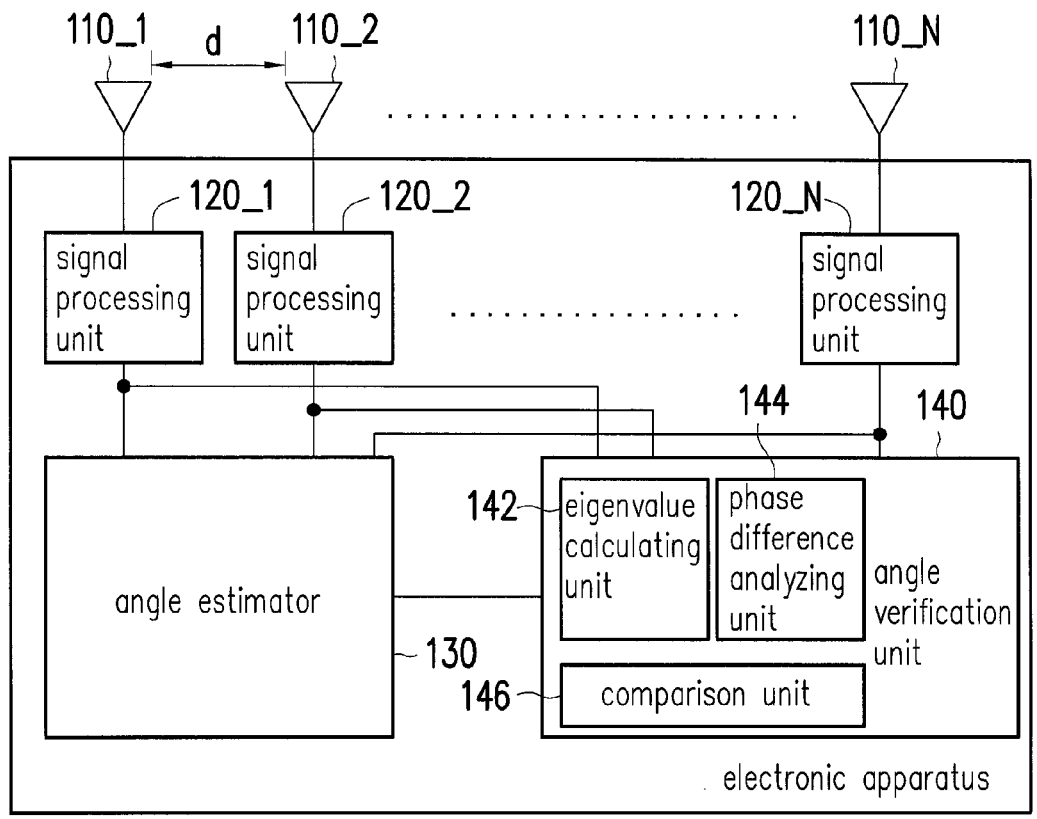

FIG. 1

- S201 — Extracting an estimated angle from the angle estimator.
- S203 — Generating an autocorrelation matrix according to a signal vector formed by a plurality of measurements of a received signal received by each of the antennas so as to obtain a plurality of eigenvalues.
- S205 — Among phase difference data generated by a plurality of antenna groups, calculating a plurality of possible estimated angles corresponding to the phase difference data not caused by a coterminal angle effect.
- S207 — Determining whether the received signal corresponds to a single target or multiple targets according to the eigenvalues and the possible estimated angles so as to verify the reliability of the estimated angle.

FIG. 2

METHOD AND ELECTRONIC APPARATUS FOR ANGLE ESTIMATION VERIFICATION

CROSS-REFERENCE TO RELATED APPLICATION

This application claims the priority benefit of Taiwan application serial no. 102136235, filed on Oct. 7, 2013. The entirety of the above-mentioned patent application is hereby incorporated by reference herein and made a part of this specification.

BACKGROUND OF THE INVENTION

1. Field of the Invention

The present invention generally relates to a method and an electronic apparatus for verification, in particular, to a method and an electronic apparatus for angle estimation verification.

2. Description of Related Art

Following the rapid increase in population and gradual recovery on the global economy, disposable personal income and consumption ability have been increased year by year and lead to continuously increasing global vehicle sales. With the continuous growth in vehicle sales, the automobile electronic industry has been dramatically developed which covers six major aspects including an automobile safety system, an automobile body system, a driver information system, a suspension & chassis system, an engine transmission system, and a security system, where the automobile safety system hold the highest compound annual growth rate among these aspects.

With an ever-increasing number of vehicles, the probability of road traffic accidents has consequently gone up. A European study shows that 0.5 seconds of early warning time may prevent at least 60% of rear-end collisions, 30% of head-on collisions, and 50% of road-related accidents; 1 second of early warning time may prevent 90% of accidents. Therefore, the vehicle safety system is crucially important.

In terms of functionality and category, the vehicle safety system may be classified into an active type and a passive type. Prior to year 2000, the active safety system such as seat belts or safety airbags dominates the market. With the advancement of semiconductor technology and high frequency electronic circuit technology since year 2000, electronic systems with a high computation performance have been able to be manufactured. Moreover, due to people's high demand on the safety, the safety system has been transited from passive reduction in accidents to active avoidance from accidents. Thus, the active safety system has been rapidly developed. In an actual driving situation, the active safety system may provide an early warning prior to any accident occurring by reminding the driver or actively controlling the vehicle to avoid from a dangerous situation to protect the driver, and thus the active safety system may be more important than the passive safety system.

Accordingly, the current active safety system has undergone a significant progress, which dominates the overall automobile safety system market. The current active safety system includes an adaptive cruise control (ACC) system, a Stop & Go system, a lane departure warning system, an environment recognition system, a collision avoidance system, and an advanced driver aid system (ADAS). The major development on the active safety system lies in the following three categories: basic collision-avoidance warning technology, advanced collision-avoidance technology, and basic driver information equipment. The basic collision-avoidance warning technology involves adaptive cruise control, rear end collision-avoidance, frontal pedestrian and obstacle detection. The advanced collision-avoidance technology involves avoidance from improper lane change and collision-accidents at crossroads. The basic driver information equipment includes road guide, real-time traffic, driver information and navigation.

The European governments are focusing on developing a driver monitoring system, a road condition detection system, and a smart steering control. The U.S. government is cooperating with General Motors to develop and test a rear view collision avoidance system. Japan is conducting a large amount of on-road verification test on Smartway which employs various sub-systems such as a front radar and a lane departure warning indicator to perform various advanced functions such as cruise control, collision avoidance, and lane tracking.

The adaptive cruise control in the active system has been extended toward a constant-speed cruise control, the application of which includes a high-speed, low-speed, and all-speed cruise controls. The principle of the adapted cruise control is that, during a constant-speed driving, a radar system installed in the front of the vehicle is utilized for detecting the traffic situation in the front of the vehicle to maintain a safe driving distance. When another vehicle enters the lane and results in an insufficient safe driving distance, the driving speed of the vehicle may be automatically reduced. When there is a sufficient safe driving distance, the driving speed of the vehicle may be automatically increased to the speed set by the driver. Such adaptive cruse control system is provided in most of the high-end vehicles. On the other hand, the Stop & Go system is an advanced version of the adaptive cruise control system, where the improvement of which is that it may optionally reduce the speed to stop the vehicle rather than shut down the system function at a specific speed. Additionally, the Stop & Go system may automatically accelerate the vehicle to a preset speed and maintain the vehicle distance once the vehicle ahead moves again, where the preset speed may be automatically adjusted based on the traffic. Hence, the Stop & Go system is suitable for handling traffic congestion in urban areas.

In view of the foregoing, in the adaptive cruise control and Stop & Go systems, the front collision-avoidance radar is a crucial component. Once the radar misjudges and provides false information, it will cause the entire system to respond incorrectly. Target detection is an important aspect in a vehicle radar system, which not only provides a relative position of the target so as to enhance the driving safety but also estimates a lane change and an actual traffic condition through the motion trajectory of the target in the front.

However, when the radar system is in an environment where multiple targets exist, referred to as an overlapping event, the targets may correspond to exact or close values in the frequency spectrum. If no suitable determination mechanism is provided in the radar system, it may result in an incorrect estimation on the target.

SUMMARY OF THE INVENTION

Accordingly, the present invention is directed to a method and an electronic apparatus for angle estimation verification, which may verify an estimated angle calculated by the apparatus.

The present invention is directed to a method for verifying an estimated angle calculated by an electronic apparatus having an angle estimator and at least three antennas. The method includes the following steps. The estimated angle is extracted from the angle estimator. An autocorrelation matrix is generated according to a signal vector formed by a plurality of measurements of a received signal received by each of the antennas so as to obtain a plurality of eigenvalues. A plurality of possible estimated angles corresponding to first phase difference data among phase difference data generated by a plurality of antenna groups are calculated. The antenna groups are formed by all different combinations of two of the antennas. Each of the phase difference data is a phase difference of the received signal received by each of the antenna groups. Each of the first phase difference data is the phase difference data not caused by a coteminal angle effect. Next, whether the received signal corresponds to a single target or multiple targets is determined according to the eigenvalues and the possible estimated angles so as to verify the reliability of the estimate angle.

According to an embodiment of the present invention, the steps of generating the autocorrelation matrix according to the signal vector formed by the measurements of the received signal received by each of the antennas so as to obtain the eigenvalues are included as follows. A backward conjugate signal vector is generated according to the signal vector, where the backward conjugate signal vector is a backward conjugate vector of the signal vector. The autocorrelation matrix is generated according to the signal vector and the backward conjugate signal vector. A singular value decomposition is performed on the autocorrelation matrix so as to obtain the eigenvalues.

According to an embodiment of the present invention, the formulas for generating the autocorrelation matrix according to the signal vector formed by the measurements of the received signal received by each of the antennas so as to obtain the eigenvalues include Eq.(1)-Eq.(3):

$$r = [\, r_1 \quad r_2 \quad \ldots \quad r_N \,]^T \qquad \text{Eq. (1)}$$

$$r_b = [\, r_N^* \quad \ldots \quad r_2^* \quad r_1^* \,]^T \qquad \text{Eq. (2)}$$

$$R = \frac{1}{2}(rr^T + r_b r_b^T) = U\Sigma V^H \qquad \text{Eq. (3)}$$

where N is the number of the antennas; $r_1, r_2, \ldots, r_N$ are the measurements of the received signal received by the 1-st, 2-nd, ..., N-th antennas respectively; r is the signal vector; $r_b$ is the backward conjugate signal vector; R is the autocorrelation matrix, U and V are N×N unitary matrices; $(\bullet)^*$ is a conjugate operator; $(\bullet)^H$ is a Hermitian operator; $(\bullet)^T$ is a transpose operator; $\Sigma$ is a diagonal matrix and written as Eq.(4):

$$\Sigma = \begin{bmatrix} \lambda_1 & 0 & \ldots & 0 \\ 0 & \lambda_2 & \ldots & 0 \\ \vdots & \vdots & \ddots & \vdots \\ 0 & 0 & \ldots & \lambda_N \end{bmatrix} \qquad \text{Eq. (4)}$$

where $\lambda_1, \lambda_2, \ldots,$ and $\lambda_N$ are the eigenvalues and $\lambda_1 \geq \lambda_2 \geq \ldots \geq \lambda_N$.

According to an embodiment of the present invention, the steps of calculating the possible estimated angles corresponding to the first phase difference data among the phase difference data generated by the antenna groups are included as follows. A plurality of first antenna groups within a range of a field of view of the electronic apparatus are obtained according to an antenna spacing between each of the adjacent antennas and a wavelength of the received signal, where each of the first antenna groups corresponds to each of the first phase difference data respectively. Each of the possible estimated angles is calculated according to each of the first phase data respectively.

According to an embodiment of the present invention, the formula for obtaining the first antenna groups within the range of the field of view of the electronic apparatus according to the antenna spacing and the wavelength of the received signal includes Ineq.(5):

$$\sin(\theta_{FOV}) \leq \left| \frac{\lambda}{2 \times (p-q) \times d} \right| \qquad \text{Ineq. (5)}$$

where $\theta_{FOV}$ is the field of view of the electronic apparatus; $\lambda$ is the wavelength of the received signal; d is the antenna spacing; p and q are reference numbers of two of the antennas.

According to an embodiment of the present invention, the steps of determining whether the received signal corresponds to a single target or multiple targets according to the eigenvalues and the possible estimated angles so as to verify the reliability of the estimate angle are included as follows. The eigenvalues are sorted from greatest to least so as to generate an eigenvalue series. A scaling ratio is generated according to the ratio of the eigenvalue at the first of the eigenvalue series to the eigenvalue at the second of the eigenvalue series. A standard deviation of the possible estimated angles is calculated. The scaling ratio and the standard deviation of the possible estimated angles are compared with a first threshold value and a second threshold value respectively. Whether or not the scaling ratio is greater than the first threshold value and the standard deviation of the possible estimated angles is less than the second threshold value are determined. If yes, it is determined that the received signal corresponds to a single target and the estimated angle is reliable. If not, it is determined that the received signal corresponds to multiple targets and the estimated angle is unreliable.

According to an embodiment of the present invention, after the step of determining whether the received signal corresponds to a single target or multiple targets according to the eigenvalues and the possible estimated angles so as to verify the reliability of the estimate angle, the method further includes the following step. When the estimated angle is determined unreliable, the angle estimator is notified to recalculate the estimated angle.

The present invention is further directed to an electronic apparatus including at least three antennas, at least three signal processing units, an angle estimator, and an angle verification unit. The signal processing units are coupled to each of the antennas respectively. The angle estimator is coupled to the signal processing units. The verification unit is coupled to the signal processing units and the angle estimator. The antennas are configured to receive a received signal, where a plurality of antenna groups are formed by all different combinations of two of the antennas. The signal processing units are configured to calculate a plurality of measurements of the received signal received by each of the antennas so as to generate a signal vector as well as calculate a phase difference of the received signal received by each of the antenna groups so as to generate phase difference data. The angle estimator is configured to calculate an estimated angle according to the measurements of the received signal received by each of the antennas. The angle verification unit includes an eigenvalue calculating unit, a phase difference analyzing unit, and a comparison unit. The eigenvalue calculating unit generates an autocorrelation matrix according to a signal vector formed by the measurements of the received signal so as to obtain a plurality of eigenvalues. The phase difference analyzing unit calculates a plurality of possible estimated angles corresponding to a plurality of first phase difference data, wherein each of the first phase difference data is the phase difference data not caused by a coteminal angle effect. The comparison unit determines whether the received signal corresponds to a single target or multiple targets according to the eigenvalues and the possible estimated angles so as to verify the reliability of the estimated angle.

According to an embodiment of the present invention, the eigenvalue calculating unit generates a backward conjugate signal vector according to the signal vector, generates the autocorrelation matrix according to the signal vector and the backward conjugate signal vector, and performs a singular value decomposition on the autocorrelation matrix so as to obtain the eigenvalues, where the backward conjugate signal vector is a backward conjugate vector of the signal vector.

According to an embodiment of the present invention, the formulas used by the eigenvalue calculating unit for obtaining the eigenvalues include Eq.(1)-Eq.(3):

$$r = [\, r_1 \quad r_2 \quad \ldots \quad r_N \,]^T \qquad \text{Eq. (1)}$$

$$r_b = [\, r_N^* \quad \ldots \quad r_2^* \quad r_1^* \,]^T \qquad \text{Eq. (2)}$$

$$R = \frac{1}{2}(rr^T + r_b r_b^T) = U\Sigma V^H \qquad \text{Eq. (3)}$$

where N is the number of the antennas; $r_1, r_2, \ldots, r_N$ are the measurements of the received signals received by the 1-st, 2-nd, ..., N-th antennas respectively; r is the signal vector; $r_b$ is the backward conjugate signal vector; R is the autocorrelation matrix; U and V are N×N unitary matrices; $(\bullet)^*$ is a conjugate operator; $(\bullet)^H$ is a Hermitian operator; $(\bullet)^T$ is a transpose operator; $\Sigma$ is a diagonal matrix and written as Eq.(4):

$$\Sigma = \begin{bmatrix} \lambda_1 & 0 & \ldots & 0 \\ 0 & \lambda_2 & \ldots & 0 \\ \vdots & \vdots & \ddots & \vdots \\ 0 & 0 & \ldots & \lambda_N \end{bmatrix} \qquad \text{Eq. (4)}$$

where $\lambda_1, \lambda_2, \ldots$, and $\lambda_N$ are the eigenvalues and $\lambda_1 \geq \lambda_2 \geq \ldots \geq \lambda_N$.

According to an embodiment of the present invention, the phase difference analyzing unit obtains a plurality of first antenna groups within a range of a field of view of the electronic apparatus according to an antenna spacing between each of the adjacent antennas and a wavelength of the received signal, and calculates each of the possible estimated angles according to each of the first phase data respectively, where each of the first antenna groups corresponds to each of the first phase difference data respectively.

According to an embodiment of the present invention, the formula used by the phase difference analyzing unit for obtaining the first antenna groups according to the antenna spacing and the wavelength of the received signal comprises Ineq.(5):

$$\sin(\theta_{FOV}) \leq \left| \frac{\lambda}{2 \times (p-q) \times d} \right| \qquad \text{Ineq. (5)}$$

where $\theta_{FOV}$ is the field of view of the electronic apparatus; $\lambda$ is the wavelength of the received signal; d is the antenna spacing; p and q are reference numbers of two of the antennas.

According to an embodiment of the present invention, the eigenvalue analyzing unit sorts the eigenvalues from greatest to least so as to generate an eigenvalue series as well as generates a scaling ratio according to the ratio of the eigenvalue at the first of the eigenvalue series to the eigenvalue at the second of the eigenvalue series. The phase difference analyzing unit calculates a standard deviation of the possible estimated angles. The comparison unit compares the scaling ratio and the standard deviation of the possible estimated angles with a first threshold value and a second threshold value respectively as well as determines whether or not the scaling ratio is greater than the first threshold value and the standard deviation of the possible estimated angles is less than the second threshold value. If the determination is yes, the comparison unit determines that the received signal corresponds to a single target and accordingly determines that the estimated angle is reliable. If the determination is not, the comparison unit determines that the received signal corresponds to multiple targets and accordingly determines that the estimated angle is unreliable.

According to an embodiment of the present invention, when the estimated angle is determined unreliable, the verification unit notifies the angle estimator to recalculate the estimated angle.

In summary, in the method for angle estimation verification provided in the present invention, an electronic apparatus having at least three antennas is able to calculate eigenvalues and possible estimated angles according to a plurality of measurements of a received signal and further determine whether the received signal corresponds to a single target or multiple target so as to verify an estimated angle calculated by an angle estimator. The method may quickly and accurately detect whether or not an overlapping event occurs in the frequency spectrum so that the electronic apparatus may obtain the information of a real target with accuracy and further reduce the computation such as target tracking in a follow-up process.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

FIG. 1 is a block diagram of an electronic apparatus according to an embodiment of the present invention.

FIG. 2 is a flow chart of a method for angle estimation verification according to an embodiment of the present invention.

DESCRIPTION OF THE EMBODIMENTS

Figure 3:
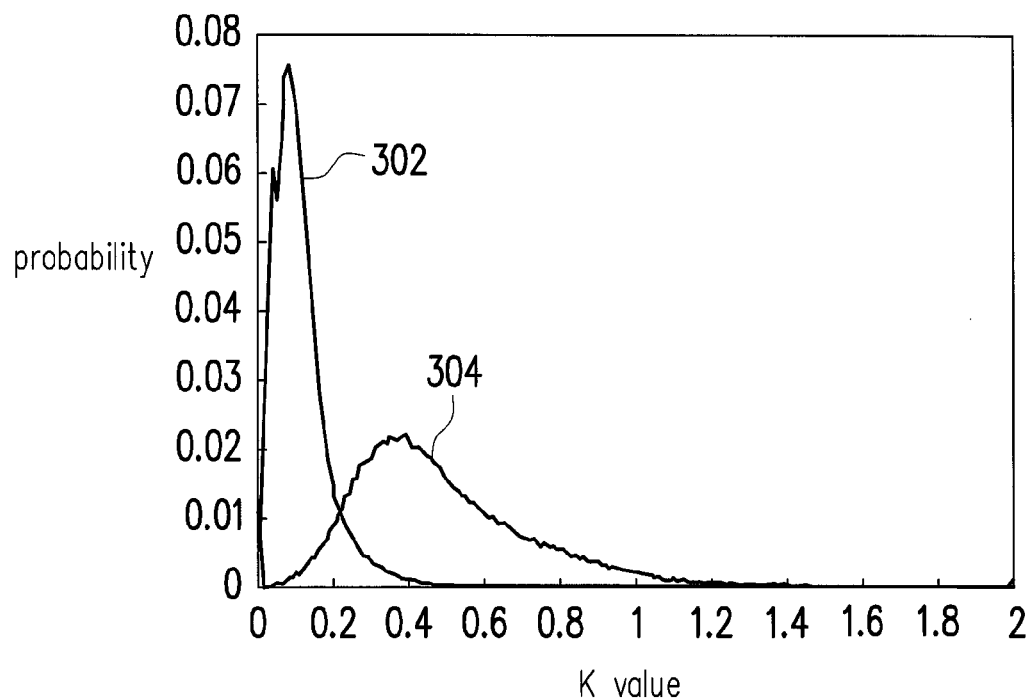
FIG. 3 illustrates simulated K-value distributions for a single target and multiple targets.

Reference will now be made in detail to the present embodiments of the invention, examples of which are illustrated in the accompanying drawings. Wherever possible, the same reference numbers are used in the drawings and the description to refer to the same or like parts. In addition, the specifications and the like shown in the drawing figures are intended to be illustrative, and not restrictive. Therefore, specific structural and functional detail disclosed herein are not to be interpreted as limiting, but merely as a representative basis for teaching one skilled in the art to variously employ the present invention.

In a frequency modulation continuous wave (FMCW) radar device, a measuring signal may be transmitted through a transmitting antenna. When such measuring signal hits on a target and generates a reflected signal, the radar device may utilize a plurality of receiving antennas for receiving the reflected signal and calculate the information such as the distance and the angle between the target and the radar device according to measurements of the reflected signal received by all of the receiving antennas. However, in a situation where multiple targets exist, if an overlapping event of the targets occurs in the frequency spectrum, an error may occur between an actual angle and an estimated angle calculated by the radar device according to all of the measurements. If more information on the angle is needed, an additional array antenna signal processing procedure is required.

However, taking the computation and reliability into consideration, a hardware acceleration design with higher cost for real-time processing or a processor with high computation performance for executing algorithms needs to be employed for additional signal processing on all detection results in the frequency spectrum. Hence, a procedure is designed in the present invention for determining whether or not the overlapping event occurs so as to verify the reliability of the aforementioned estimated angle. If the estimated angle is reliable, the radar device is not required to perform additional signal processing. The overall computation in the radar device may be reduced through this filtration mechanism.

FIG. 1 is a block diagram of an electronic apparatus according to an embodiment of the present invention. It should, however, be noted that this is merely an illustrative example and the present invention is not limited in this regard. All components of the electronic apparatus and their configurations are first introduced in FIG. 1. The detailed functionalities of the components are disclosed along with FIG. 2.

Referring to FIG. 1, an electronic apparatus 100 in the present embodiment includes a plurality of antennas 110_1-110_N, a plurality of signal processing units 120_1-120_N, an angle estimator 130, and a verification unit 140, where N is a positive integer greater than or equal to 3. The signal processing units 120_1-120_N are coupled to the antennas 110_1-110_N respectively; the angle estimator 130 is coupled to the signal processing units 120_1-120_N; the verification unit 140 is coupled to the signal processing units 120_1-120_N and the angle estimator 130.

The antennas 110_1-110_N may be arranged in an array on the electronic apparatus 100, where an antenna spacing between each of the adjacent antennas is d. After the electronic apparatus 100 transmits a measuring signal through a transmitting antenna (not shown), when such measuring signal hits on a target and generates a reflected signal, the antennas 110_1-110_N are configured to receive the reflected signal. Here, such reflected signal is defined as a "received signal".

The signal processing units 120_1-120_N may be hardware such as communication signal processing units, processors, or computer systems, or software with communication signal processing capability (e.g. application program capable of communication signal demodulation). In addition, the signal processing units 120_1-120_N may be a combination of hardware and software. The signal processing units 120_1-120_N are configured to process the received signal received by the antennas 110_1-110_N and calculate measurements $r_1, r_2, \ldots,$ and $r_N$ of the received signal received by each of the antennas 110_1-110_N respectively.

The angle estimator 130 and the verification unit 140 may be software, firmware, or implemented as one or a plurality of integrated circuits. The angle estimator 130 is configured to calculate the angle between the electronic apparatus 100 and the target according to the measurements $r_1, r_2, \ldots,$ and $r_N$. The angle mentioned herein is defined as an "estimated angle". The verification unit 140, including an eigenvalue calculating unit 142, a phase difference analyzing unit 144, and a comparison unit 146, is configured to verify the reliability of the estimated angle calculated by the angle estimator 130.

FIG. 2 is a flow chart of a method for angle estimation verification according to an embodiment of the present invention. Referring to FIG. 2, the verification unit 140 extracts an estimated angle from the angle estimator 130 (Step S201). To be specific, the angle estimator 130 calculates the estimated angle between the electronic apparatus 100 and a target according to all measurements $r_1, r_2, \ldots,$ and $r_N$. In an embodiment, the angle estimator 130 may calculate the estimated angle by the maximum likelihood estimation method according to all of the measurements $r_1, r_2, \ldots,$ and $r_N$. The verification unit 140 may extract the estimated angle and verify its reliability in the follow-up steps.

Next, the eigenvalue calculating unit 142 of the verification unit 140 generates an autocorrelation matrix according to a signal vector formed by the measurements $r_1, r_2, \ldots,$ and $r_N$ of the received signal received by each of the antennas so as to obtain a plurality of eigenvalues (Step S203). To be specific, after the eigenvalue calculating unit 142 obtains the measurements $r_1, r_2, \ldots,$ and $r_N$ from the signal processing units 120_1-120_N, it may record the measurements $r_1, r_2, \ldots,$ and $r_N$ in a form of Eq.(1):

$$r = [r_1 r_2 \ldots r_N]^T \quad \text{Eq. (1)}$$

where r is the signal vector, and $(\bullet)^T$ is a transpose operator. Then, the eigenvalue calculating unit 142 calculates the backward conjugate vector of the signal vector, which is defined as a "backward conjugate signal vector" herein and may be written as Eq.(2):

$$r_b = [r_N^* \ldots r_2^* r_1^*]^T \quad \text{Eq. (2)}$$

where $r_b$ is the backward conjugate signal vector, and $(\bullet)^*$ is a conjugate operator. Next, the eigenvalue calculating unit 142 generates the autocorrelation matrix of the received signal according to the signal vector and the backward conjugate signal vector and then performs a singular value decomposition (SVD) on the autocorrelation matrix so as to obtain the aforementioned eignevalues.

The aforementioned autocorrelation matrix may be written as Eq.(3):

$$R = \frac{1}{2}(rr^T + r_b r_b^T) = U\Sigma V^H \quad \text{Eq. (3)}$$

where R is the autocorrelation matrix; U and V are N×N unitary matrices; $(\bullet)^H$ is a Hermitian operator; $\Sigma$ is a diagonal matrix and may be written as follows:

$$\Sigma = \begin{bmatrix} \lambda_1 & 0 & \cdots & 0 \\ 0 & \lambda_2 & \cdots & 0 \\ \vdots & \vdots & \ddots & \vdots \\ 0 & 0 & \cdots & \lambda_N \end{bmatrix} \quad \text{Eq. (4)}$$

where $\lambda_1, \lambda_2, \ldots,$ and $\lambda_N$ are the aforementioned eigenvalues, and $\lambda_1 \geq \lambda_2 \geq \ldots \geq \lambda_N$.

When an overlapping event occurs, the value of $\lambda_2$ becomes larger, i.e. $\lambda_2$ is more approximate to $\lambda_1$. When there only exists a single target, the value of $\lambda_2$ becomes smaller, i.e. $\lambda_2$ is further away from $\lambda_1$. Accordingly, after the eigenvalue calculating unit 142 obtains the aforementioned eigenvalues, it may sort the eigenvalues from greatest to least so as to generate an eigenvalue series and further generate a scaling ratio according to the ratio of the eigenvalue at the first of the eigenvalue series to the eigenvalue at the second of the eigenvalue series.

In the present embodiment, the aforementioned scaling ratio may be written as follows:

$$K = 10\log_{10}\left(\frac{\lambda_1}{\lambda_2}\right)$$

The eigenvalue calculating unit 142 may pre-obtain a threshold value, defined as a "first threshold value" herein, for distinguishing a single target from multiple targets according to the distribution of K values in a simulation process. For example, FIG. 3 illustrates simulated K-value distributions for a single target and multiple targets. A curve 302 represents the distribution of multiple targets; a curve 304 represents the distribution of a single target. In an embodiment, the first threshold value may be preset to the intersection of the curve 302 and the curve 304, e.g. 0.2. In other embodiments, the first threshold value may be calculated with more accuracy according to the probability distribution models of the curve 302 and the curve 304 as well as practical considerations.

However, in terms of FIG. 3, there exists an overlap region of the curve 302 and the curve 304, and therefore it may be insufficient to determine the occurrence of an overlapping event merely based on the eigenvalues. In the present invention, the verification unit 140 may use the phase difference between any two of the antennas 110_1-110_N for additionally verifying the reliability of the estimated angle.

Taking the antennas 110_1-110_N as an example, any two of the antennas may form $$\frac{N(N-1)}{2}$$

combinations of antenna groups, where each of the antenna group corresponds to a piece of phase difference data. In other words, each of the phase difference data is the phase difference between the received signal of each of the two antennas among the antennas 110_1-110_N. The phase difference analyzing unit 144 of the verification unit 140 calculates a plurality of possible estimated angles corresponding to the phase difference data not caused by a coterminal angle effect (Step S205). Here, the phase difference data not caused by the coterminal angle effect is defined as "first phase difference data", where the first phase difference data is generated from first antenna groups among the aforementioned antenna groups.

To be specific, given that the antenna 110_1 is a reference point. If no overlapping event occurs, the measurements of the received signal of each of the antennas 110_1-110_N may be rewritten as follows:

$$r = [r_1 \ r_2 \ \cdots \ r_N]^T = [1 \ e^{j\varphi} \ \cdots \ e^{j(N-1)\varphi}]^T \quad \text{Eq. (4.5)}$$

where $\varphi = \frac{2\pi}{\lambda}d\sin(\theta)$;

$\lambda$ is the wavelength of the received signal; d is the antenna spacing; $\theta$ is the angle between the electronic apparatus 100 and the target. If an overlapping event occurs, the measurement of the receive signal of each of the antenna 110_1-110_N may not be written in any structural form (e.g. Eq. (4.5)), and the possible estimated angles corresponding to the phase difference calculated by the measurements may result in a large variation.

Hence, in order to prevent estimate error caused by the coterminal effect, before the phase difference analyzing unit 144 calculates the possible estimated angles, a field of view of the electronic apparatus 100 needs to satisfy Ineq.(5) or Ineq. (6):

$$\sin(\theta_{FOV}) \leq \left|\frac{\lambda}{2\times(p-q)\times d}\right| \quad \text{Ineq. (5)}$$

$$e^{-j\pi} \leq e^{-j\frac{2\pi d}{\lambda}(p-q)\sin(\theta_{FOV})} \leq e^{j\pi} \quad \text{Ineq. (6)}$$

where Ineq.(5) is derived from the domain of the phase (i.e. Ineq.(6)); $\theta_{FOV}$ is the field of view of the electronic apparatus; $\lambda$ is the wavelength of the received signal; d is the antenna spacing; p and q are reference numbers of two of the antennas. Next, the phase difference analyzing unit 144 may obtain the antenna groups which satisfy Ineq.(5) or Ineq.(6), i.e. the first antenna groups, and calculate the possible estimated values corresponding to first antenna groups according to the phase difference data thereof.

Figure 4:
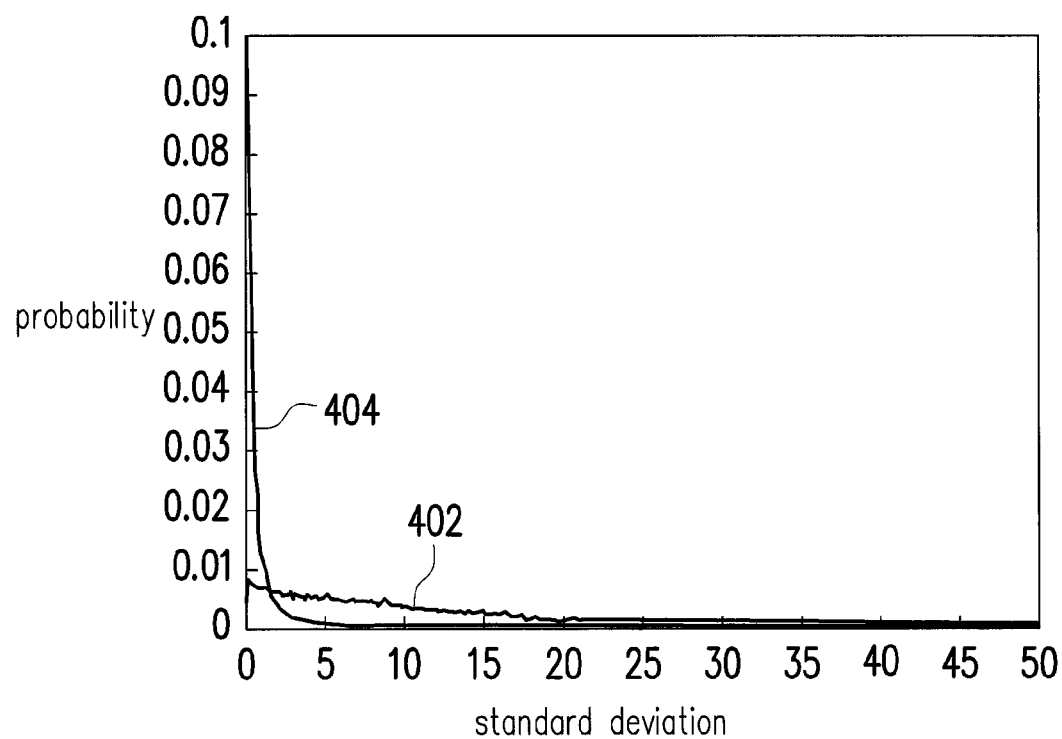
FIG. 4 illustrates distributions of simulated standard deviations for a single target and multiple targets.

Next, the phase difference analyzing unit 144 may calculate the standard deviation of the possible estimated angles corresponding to all of the first antenna groups. The phase difference analyzing unit 144 may pre-obtain another threshold value, defined as a "second threshold value" herein, for distinguishing a single target from multiple targets according to the distribution of standard deviations in a simulation process. For example, FIG. 4 illustrates distributions of simulated standard deviations for a single target and multiple targets. If an overlapping event occurs, i.e. there exist multiple targets, the standard deviations of the possible estimated angles from every simulation may be distributed in a wider range and the values may be smaller; that is, the curve 402. If no overlapping event occurs, i.e. there only exists a single target, the standard deviations of the possible estimated angles from every simulation may be clustered in a smaller range and the values may be larger; that is, the curve 404. In an embodiment, the second threshold value may be preset to the intersection of the curve 402 and the curve 404, e.g. 1.0. In other embodiments, the second threshold value may be calculated with more accuracy according to the probability distribution models of the curve 402 and the curve 404 as well as practical considerations.

Next, the comparison unit 150 determines whether the received signal corresponds to a single target or multiple targets according to the eigenvalues and the possible estimated angles so as to verify the reliability of the estimated angle (Step S207). In other words, the comparison unit 150 compares the aforementioned scaling ratio and the standard deviation of the possible estimated angles with the first threshold value and the second threshold value respectively.

To be specific, if the scaling ratio is greater than the first threshold value and the standard deviation of the possible estimated angles is less than the second threshold value, the comparison unit 150 may determine that no overlapping event occurs. That is, the received signal corresponds to a single target, and it means that the estimated angle calculated by the angle estimator 130 is reliable. By contrast, if any or both of the scaling ratio and the standard deviation of the possible estimated angles do not satisfy the above conditions, the comparison unit 146 may determine that an overlapping event occurs. That is, the received signal corresponds to multiple targets, and it means that the estimated angle calculated by the angle estimator 130 is unreliable.

In an embodiment, when the estimated angle calculated by the angle estimator 130 is unreliable, the comparison unit 146 may notify the electronic apparatus 100 for additional signal processing, and the angle estimator 130 may recalculate a more accurate estimated angle.

In summary, in the method for angle estimation verification provided in the present invention, an electronic apparatus having at least three antennas is able to calculate eigenvalues and possible estimated angles according to a plurality of measurements of a received signal and further determine whether the received signal corresponds to a single target or multiple target so as to verify an estimated angle calculated by an angle estimator. The method may quickly and accurately detect whether or not an overlapping event occurs in the frequency spectrum so that the electronic apparatus may obtain the information of a real target with accuracy and further reduce the computation such as target tracking in a follow-up process.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A method for angle estimation verification, adapted to an electronic apparatus having an angle estimator, at least three antennas, and an angle verification unit, wherein the method comprises:

extracting an estimated angle by the angle verification unit, wherein the estimated angle is calculated by and extracted from the angle estimator;

generating an autocorrelation matrix by the angle verification unit according to a signal vector formed by a plurality of measurements of a received signal received by each of the antennas so as to obtain a plurality of eigenvalues;

calculating a plurality of possible estimated angles corresponding to first phase difference data among phase difference data generated by a plurality of antenna groups by the angle verification unit, wherein the antenna groups are formed by all different combinations of two of the antennas, wherein each of the phase difference data is a phase difference of the received signal received by each of the antenna groups, wherein each of the first phase difference data is the phase difference data not caused by a coterminal angle effect;

determining whether the received signal corresponds to a single target or multiple targets by the angle verification unit according to the eigenvalues and the possible estimated angles so as to verify the reliability of the estimate angle; and notifying the angle estimator to recalculate the estimated angle by the angle verification unit when the estimated angle is determined unreliable.

2. The method according to claim 1, wherein the steps of generating the autocorrelation matrix by the angle verification unit according to the signal vector formed by the measurements of the received signal received by each of the antennas so as to obtain the eigenvalues comprise:

generating a backward conjugate signal vector according to the signal vector, wherein the backward conjugate signal vector is a backward conjugate vector of the signal vector;

generating the autocorrelation matrix according to the signal vector and the backward conjugate signal vector; and performing a singular value decomposition on the autocorrelation matrix so as to obtain the eigenvalues.

3. The method according to claim 2, wherein the formulas for generating the autocorrelation matrix by the angle verification unit according to the signal vector formed by the measurements of the received signal received by each of the antennas so as to obtain the eigenvalues comprise Eq.(1)-Eq.(3):

$$r = [\, r_1 \quad r_2 \quad \ldots \quad r_N \,]^T \qquad \text{Eq. (1)}$$

$$r_b = [\, r_N^* \quad \ldots \quad r_2^* \quad r_1^* \,]^T \qquad \text{Eq. (2)}$$

$$R = \frac{1}{2}(rr^T + r_b r_b^T) = U\Sigma V^H \qquad \text{Eq. (3)}$$

wherein N is the number of the antennas, wherein $r_1$, $r_2$, . . . , $r_N$ are the measurements of the received signal received by the 1-st, 2-nd, . . . , N-th antennas respectively, wherein r is the signal vector, $r_b$ is the backward conjugate signal vector, R is the autocorrelation matrix, U and V are N×N unitary matrices, $(\bullet)^*$ is a conjugate operator, $(\bullet)^H$ is a Hermitian operator, $(\bullet)^T$ is a transpose operator, $\Sigma$ is a diagonal matrix and written as Eq.(4):

$$\Sigma = \begin{bmatrix} \lambda_1 & 0 & \ldots & 0 \\ 0 & \lambda_2 & \ldots & 0 \\ \vdots & \vdots & \ddots & \vdots \\ 0 & 0 & \ldots & \lambda_N \end{bmatrix} \qquad \text{Eq. (4)}$$

wherein $\lambda_1, \lambda_2, \ldots,$ and $\lambda_N$ are the eigenvalues, and wherein $\lambda_1 \geq \lambda_2 \geq \ldots \geq \lambda_N$.

4. The method according to claim 3, wherein the steps of calculating the possible estimated angles corresponding to the first phase difference data among the phase difference data generated by the antenna groups by the angle verification unit comprise:

obtaining a plurality of first antenna groups within a range of a field of view of the electronic apparatus according to an antenna spacing between each of the adjacent antennas and a wavelength of the received signal, wherein each of the first antenna groups corresponds to each of the first phase difference data respectively; and calculating each of the possible estimated angles according to each of the first phase data respectively.

5. The method according to claim 4, wherein the formula for obtaining the first antenna groups within the range of the field of view of the electronic apparatus according to the antenna spacing and the wavelength of the received signal comprises Ineq.(5):

$$\sin(\theta_{FOV}) \le \left| \frac{\lambda}{2 \times (p-q) \times d} \right| \qquad \text{Ineq. (5)}$$

wherein $\theta_{FOV}$ is the field of view of the electronic apparatus, $\lambda$ is the wavelength of the received signal, d is the antenna spacing, and p and q are reference numbers of two of the antennas.

6. The method according to claim 1, wherein the steps of determining whether the received signal corresponds to a single target or multiple targets by the angle verification unit according to the eigenvalues and the possible estimated angles so as to verify the reliability of the estimate angle comprise:

sorting the eigenvalues from greatest to least so as to generate an eigenvalue series;

generating a scaling ratio according to the ratio of the eigenvalue at the first of the eigenvalue series to the eigenvalue at the second of the eigenvalue series;

calculating a standard deviation of the possible estimated angles;

comparing the scaling ratio and the standard deviation of the possible estimated angles with a first threshold value and a second threshold value respectively;

determining whether or not the scaling ratio is greater than the first threshold value and the standard deviation of the possible estimated angles is less than the second threshold value;

if yes, determining that the received signal corresponds to a single target and accordingly determining that the estimated angle is reliable; and if not, determining that the received signal corresponds to multiple targets and accordingly determining that the estimated angle is unreliable.

7. An electronic apparatus comprising:

at least three antennas, receiving a received signal, wherein a plurality of antenna groups are formed by all different combinations of two of the antennas;

at least three signal processing units, respectively coupled to each of the antennas, calculating a plurality of measurements of the received signal received by each of the antennas so as to generate a signal vector, and calculating a phase difference of the received signal received by each of the antenna groups so as to generate phase difference data;

an angle estimator, coupled to the signal processing unit, calculating an estimated angle according to the measurements of the received signal received by each of the antennas; and an angle verification unit, coupled to the signal processing units and the angle estimator, wherein the angle verification unit comprises an eigenvalue calculating unit, a phase difference analyzing unit, and a comparison unit, wherein the eigenvalue calculating unit generates an autocorrelation matrix according to a signal vector formed by the measurements of the received signal so as to obtain a plurality of eigenvalues, wherein the phase difference analyzing unit calculates a plurality of possible estimated angles corresponding to a plurality of first phase difference data, wherein each of the first phase difference data is the phase difference data not caused by a coterminal angle effect, and wherein the comparison unit determines whether the received signal corresponds to a single target or multiple targets according to the eigenvalues and the possible estimated angles so as to verify the reliability of the estimated angle, and notifies the angle estimator to recalculate the estimated angle when the estimated angle is determined unreliable.

8. The electronic apparatus according to claim 7, wherein the eigenvalue calculating unit generates a backward conjugate signal vector according to the signal vector, generates the autocorrelation matrix according to the signal vector and the backward conjugate signal vector, and performs a singular value decomposition on the autocorrelation matrix so as to obtain the eigenvalues, wherein the backward conjugate signal vector is a backward conjugate vector of the signal vector.

9. The electronic apparatus according to claim 8, wherein the formulas used by the eigenvalue calculating unit for obtaining the eigenvalues comprise Eq.(1)-Eq.(3):

$$r = [r_1 \quad r_2 \quad \ldots \quad r_N]^T \qquad \text{Eq. (1)}$$

$$r_b = [r_N^* \quad \ldots \quad r_2^* \quad r_1^*]^T \qquad \text{Eq. (2)}$$

$$R = \frac{1}{2}(rr^T + r_b r_b^T) = U\Sigma V^H \qquad \text{Eq. (3)}$$

wherein N is the number of the antennas, wherein $r_1, r_2, \ldots, r_N$ are the measurements of the received signals received by the 1-st, 2-nd, ..., N-th antennas respectively, wherein r is the signal vector, $r_b$ is the backward conjugate signal vector, R is the autocorrelation matrix, U and V are N×N unitary matrices, $(\bullet)^*$ is a conjugate operator, $(\bullet)^H$ is a Hermitian operator, $(\bullet)^T$ is a transpose operator, $\Sigma$ is a diagonal matrix and written as Eq.(4):

$$\Sigma = \begin{bmatrix} \lambda_1 & 0 & \ldots & 0 \\ 0 & \lambda_2 & \ldots & 0 \\ \vdots & \vdots & \ddots & \vdots \\ 0 & 0 & \ldots & \lambda_N \end{bmatrix} \qquad \text{Eq. (4)}$$

wherein $\lambda_1, \lambda_2, \ldots,$ and $\lambda_N$ are the eigenvalues, and wherein $\lambda_1 \ge \lambda_2 \ge \ldots \ge \lambda_N$.

10. The electronic apparatus according to claim 9, wherein the phase difference analyzing unit obtains a plurality of first antenna groups within a range of a field of view of the electronic apparatus according to an antenna spacing between each of the adjacent antennas and a wavelength of the received signal, and calculates each of the possible estimated angles according to each of the first phase data respectively, wherein each of the first antenna groups corresponds to each of the first phase difference data respectively.

11. The electronic apparatus according to claim 10, wherein the formula used by the phase difference analyzing unit for obtaining the first antenna groups according to the antenna spacing and the wavelength of the received signal comprises Ineq.(5):

$$\sin(\theta_{FOV}) \le \left| \frac{\lambda}{2 \times (p-q) \times d} \right| \qquad \text{Ineq. (5)}$$

wherein $\theta_{FOV}$ is the field of view of the electronic apparatus, $\lambda$ is the wavelength of the received signal, d is the antenna spacing, and p and q are reference numbers of two of the antennas.

12. The electronic apparatus according to claim 7, wherein
the eigenvalue analyzing unit sorts the eigenvalues from greatest to least so as to generate an eigenvalue series and generates a scaling ratio according to the ratio of the eigenvalue at the first of the eigenvalue series to the eigenvalue at the second of the eigenvalue series,
the phase difference analyzing unit calculates a standard deviation of the possible estimated angles,
the comparison unit compares the scaling ratio and the standard deviation of the possible estimated angles with a first threshold value and a second threshold value respectively as well as determines whether or not the scaling ratio is greater than the first threshold value and the standard deviation of the possible estimated angles is less than the second threshold value,
  wherein if yes, the comparison unit deteimines that the received signal corresponds to a single target and accordingly determines that the estimated angle is reliable, and
  wherein if not, the comparison unit determines that the received signal corresponds to multiple targets and accordingly determines that the estimated angle is unreliable.

\* \* \* \* \*